US009398370B2

(12) United States Patent
Abolfathi

(10) Patent No.: US 9,398,370 B2
(45) **Date of Patent: *Jul. 19, 2016**

(54) INTRAORAL APPLIANCE FOR SOUND TRANSMISSION VIA BONE CONDUCTION

(71) Applicant: SoundMed, LLC, Mountain View, CA (US)

(72) Inventor: Amir A. Abolfathi, Woodside, CA (US)

(73) Assignee: SoundMed, LLC, Mountain View, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 13/872,965

(22) Filed: Apr. 29, 2013

(65) Prior Publication Data

US 2013/0236035 A1 Sep. 12, 2013

Related U.S. Application Data

(63) Continuation of application No. 12/878,276, filed on Sep. 9, 2010, now Pat. No. 8,433,082.

(60) Provisional application No. 61/248,262, filed on Oct. 2, 2009.

(51) Int. Cl.
*H04R 25/00* (2006.01)
*H04R 1/46* (2006.01)

(52) U.S. Cl.
CPC ................ *H04R 1/46* (2013.01); *H04R 25/606* (2013.01); *H04R 2460/13* (2013.01)

(58) Field of Classification Search
USPC .................................................. 381/380, 151
See application file for complete search history.

(56) References Cited

U.S. PATENT DOCUMENTS 4,443,668 A 4/1984 Warren
5,033,999 A 7/1991 Mersky
5,447,489 A * 9/1995 Issalene .............. H04R 25/606 128/864
5,673,328 A 9/1997 Wandl et al.
6,086,662 A 7/2000 Brodkin et al.
7,298,857 B2 11/2007 Shennib et al.
7,486,798 B2 * 2/2009 Anjanappa ............ H04R 17/02 381/151
8,433,082 B2 4/2013 Abolfathi
2009/0052702 A1 2/2009 Murphy et al.
2009/0226011 A1 9/2009 Abolfathi et al.
2009/0226020 A1 9/2009 Abolfathi
2011/0081031 A1 4/2011 Abolfathi

FOREIGN PATENT DOCUMENTS

GB 2467053 A 7/2010
JP 07-213538 8/1998
JP 2004-000719 1/2004
WO WO 2007/140373 12/2007
WO WO 2007/143453 12/2007
WO WO 2008/030725 3/2008
WO WO 2009/025917 2/2009
WO WO 2009/111566 9/2009
WO WO 2011/041078 4/2011

* cited by examiner

*Primary Examiner* — Amir Etesam
(74) *Attorney, Agent, or Firm* — Levine Bagade Han LLP

(57) ABSTRACT

An intra-oral appliance for transmitting sound via bone conduction and optimized for comfort, safety, speech intelligibility, eating and drinking and extended wear by the user including an actuator to provide bone conduction sound transmission; a transceiver coupled to the actuator to cause the actuator to generate sound; and a first chamber containing the actuator and the transceiver, said first chamber adapted to be coupled to one or more teeth of the user.

38 Claims, 8 Drawing Sheets

INTRAORAL APPLIANCE FOR SOUND TRANSMISSION VIA BONE CONDUCTION

CROSS-REFERENCE TO RELATED APPLICATIONS

This application is a continuation of U.S. patent application Ser. No. 12/878,276 filed Sep. 9, 2010 which claims the benefit of priority to U.S. Patent Application No. 61/248,262 filed on Oct. 2, 2009, each of which is incorporated herein by reference in its entirety.

FIELD OF THE INVENTION

The present invention relates to methods and apparatuses for the transmission of sound via bone conduction by means of an intraoral appliance.

BACKGROUND OF THE INVENTION

Recent advances in miniaturized electronics and materials science have resulted in the creation of intraoral appliances incorporating actuating transducers that facilitate the transmission of sound using the principal of bone conduction. Such IOAs have been described for use in a variety of applications including the treatment of subjects with unilateral hearing loss or single-sided deafness (see, e.g., U.S. patent application Ser. No. 11/754,823), treating subjects suffering from tinnitus (see, e.g., U.S. patent application Ser. No. 11/845,712), facilitating two-way communications (see, e.g., U.S. patent application Ser. Nos. 11/952,780 and 12/175,240), and consumer electronics products such as digital audio players (see, e.g., U.S. patent application Ser. No. 12/464,310). Although the aforementioned IOAs have been shown to address disparate problems and needs, they have in common the need for the user to wear the IOA for prolonged periods of time. This necessitates that the IOA be designed so that it is optimized for comfort in the mouth of the user. Such an IOA is described herein.

SUMMARY OF THE INVENTION

In one embodiment, an intra-oral appliance is provided that is optimized for user comfort to facilitate extended wear of the appliance and includes an actuator to provide bone conduction sound transmission; a transceiver coupled to the actuator to cause the actuator to generate sound; and a first chamber containing the actuator and the transceiver, said first chamber adapted to be coupled to one or more teeth.

Implementations of the above aspect may include one or more of the following.

An actuator driver or amplifier can be connected to the actuator. A second chamber can be used to house a power source to drive the actuator and the transceiver. A bridge can connect the first and second chambers. The bridge can have electrical cabling or an antenna embedded in the bridge. The bridge can be a wired frame, a polymeric material, or a combination of polymeric material and a wired frame. A mass can be connected to the actuator. The mass can be a weight such as tungsten or a suitable module with a mass such as a battery or an electronics module. The actuator can be a piezoelectric transducer. The configuration of the actuator can be a rectangular or cantilever beam bender configuration. One or more ceramic or alumina stands can connect the actuator to other components. A compressible material can surround the actuator. A non compressible material can cover the actuator and the compressible material. A rechargeable power source can power the transceiver and the actuator. An inductive charger can recharge the battery. The chamber can be a custom oral device. A pre-built housing can be provided for the mass. The pre-built housing can have an arm and one or more bottom contacts, the arm and the contacts adapted to bias a mass against a tooth. A microphone can be connected to the transceiver, the microphone being positioned intraorally or extraorally. A data storage device can be embedded in the appliance. A first microphone can pick up body conduction sound, a second microphone can pick up ambient sound, and a noise canceller can be used to subtract ambient sound from the body conduction sound. The actuator transmits sound through a tooth, a maxillary bone, a mandibular bone, or a palatine bone. A linking unit can provide sound to the transceiver, the linking unit adapted to communicate with an external sound source. The transceiver can be a wired transceiver or a wireless transceiver.

Advantages of preferred embodiments may include one or more of the following: ease of insertion and removal of the intraoral appliance, comfortable fit, increased safety (e.g., unlikely the user can accidentally swallow the appliance or have the appliance lodge in the user's trachea), the ability to eat and drink while wearing the appliance, the ability to wear the appliance for extended periods of time (e.g., for periods of time exceeding two hours), enhanced safety such that the appliance is unlikely to be accidentally swallowed by a user or accidentally lodge in the trachea of a user, a secure fit on a tooth or teeth of the user or a tooth or teeth and a portion of another part of the user's dental anatomy such as the gingival tissue or palate without the need to adhere or affix the appliance to a portion of said user's dental anatomy by dental glue, adhesive, bonding material or the like, and the lack of any need to modify or alter the dental anatomy including any removal of or alteration to any portion of the surface of a tooth (e.g., grinding, ablation, polishing and the like) or any other part of the dental anatomy for insertion or use by the user of the appliance.

DESCRIPTION

Figure 1A:
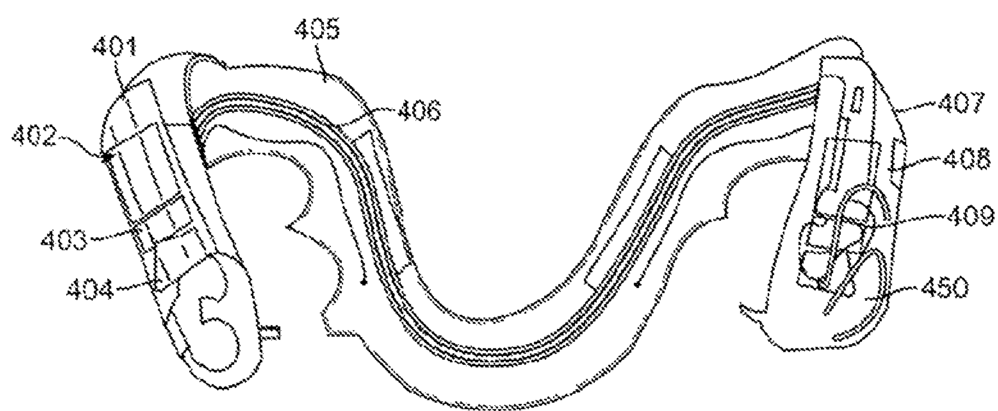
FIG. 1A shows a perspective top view of an intraoral appliance for conducting sound transmission via bone conduction.

All patents and patent applications cited herein are hereby incorporated by reference in their entireties.

Various embodiments of the intraoral appliance are described herein and depicted in the drawings. The advantages of the present invention are several and include appliances that are comfortable, facilitate extended wear, allow for eating and drinking while the appliance is worn by the user, provide for a secure fit on at least one tooth of the user or, in some embodiments, on at least one tooth and another portion of the user's dental anatomy such as the gingiva or palate, and do not require any modification to the dental anatomy including any removal of or alteration to any portion of the surface of a tooth (e.g., grinding, ablation, polishing and the like) or any other part of the dental anatomy for insertion or use by the user. Moreover, in some embodiments, bonding of the appliance to a tooth or teeth or other portion of the dental anatomy is not required to create a secure fit of the appliance in the mouth of the user as some embodiments inherently possess, by virtue of their design (e.g., the clamshell design depicted in FIGS. 1D and 1E), the means for providing a clamping force that facilitates the appliance's secure fit on the tooth or teeth of the user. No further means of affixing the appliance to the user is required.

An exemplary removable intraoral sound transmission appliance is shown in FIG. 1A. The appliance is worn by a user in his or her oral cavity. The appliance includes a power chamber 401 that supplies energy to power the appliance. The power chamber 401 includes an energy reservoir 402 such as a battery. The battery is charged by charger electronic 403 which can receive external energy through inductive coupling or can directly receive a charge through two terminals. If the charging is to be done inductively, a recharging coil 404 is also enclosed in the power chamber 401.

The power chamber 401 provides energy for electronics in an actuation chamber 407. Mechanically, the chambers 401 and 407 are connected by a bridge 405. Inside the bridge 405 are cables that supply power to the actuation chamber 407. Other devices such as antenna wires can be embedded in the bridge 405. The chambers 401, 407 and the bridge 405 are made from human compatible elastomeric materials commonly used in dental retainers, among others.

Turning now to the actuation chamber 407, an actuator 408 is positioned near the patient's teeth. The actuator 408 is driven by an electronic driver 409. A wireless transceiver 450 provides sound information to the electronic driver 409 so that the driver 409 can actuate the actuator 408 to cause sound to be generated and conducted to the patient's ear through bone conduction in one embodiment. For example, the electronic and actuator assembly may receive incoming sounds either directly or through a receiver to process and amplify the signals and transmit the processed sounds via a vibrating transducer element coupled to a tooth or other bone structure, such as the maxillary, mandibular, or palatine bone structure. Other sound transmission techniques in addition to bone conduction can be used and are contemplated by the inventors.

Figure 1B:
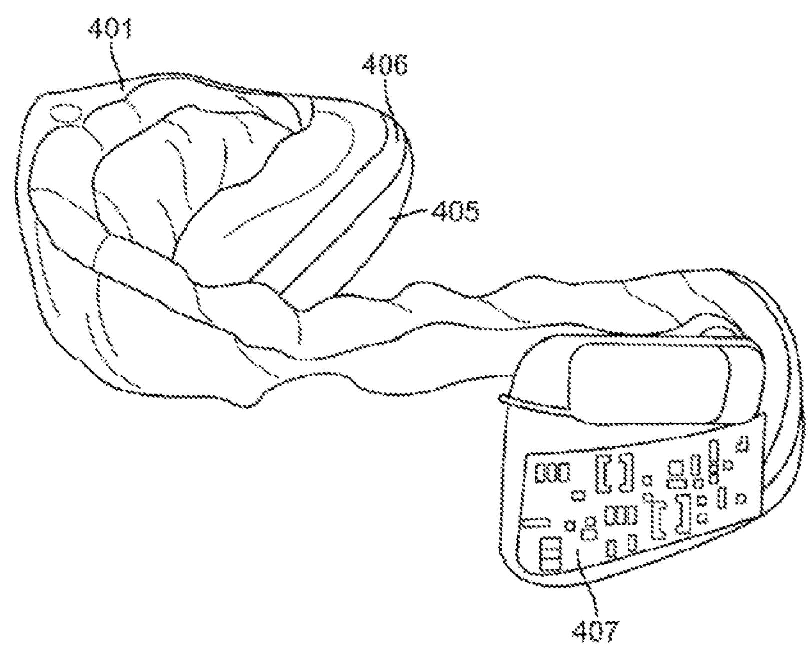
FIG. 1B shows a perspective side view of the appliance of FIG. 1A.

FIG. 1B shows a side perspective view of the appliance of FIG. 1A. The oral appliance of FIG. 1A may be to custom-made device fabricated through a variety of different process utilizing, e.g., a replicate model of a dental structure obtained by any number of methods, as described below in further detail. The oral appliance may accordingly be created to fit, adhere, or be otherwise disposed upon a portion of the patient's dentition to maintain the electronics and transducer device against the patient's dentition securely and comfortably.

Figure 1C:
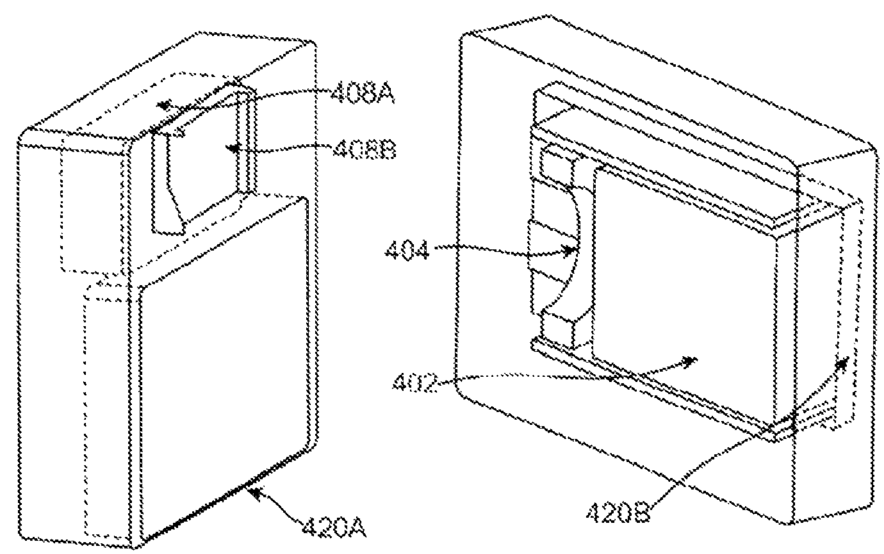
FIG. 1C shows an exemplary mechanical placement of components of each chamber of FIG. 1A.

FIG. 1C shows a perspective view of the electronics housed by the chambers 401 and 407. In the power chamber 401, the recharging coil 404 is positioned at one end and the battery 402 is positioned at the other end of the chamber 401. The control electronics for the charging operation is in a circuit hoard 420B behind the battery 402 and coil 404.

Correspondingly, in the actuation chamber 407, the actuator 408 in turn is made up of as piezoelectric actuator 408B that moves a mass 408A. The driver 409 and wireless transceiver circuitry are provided on a circuit board 420A.

Figure 1D:
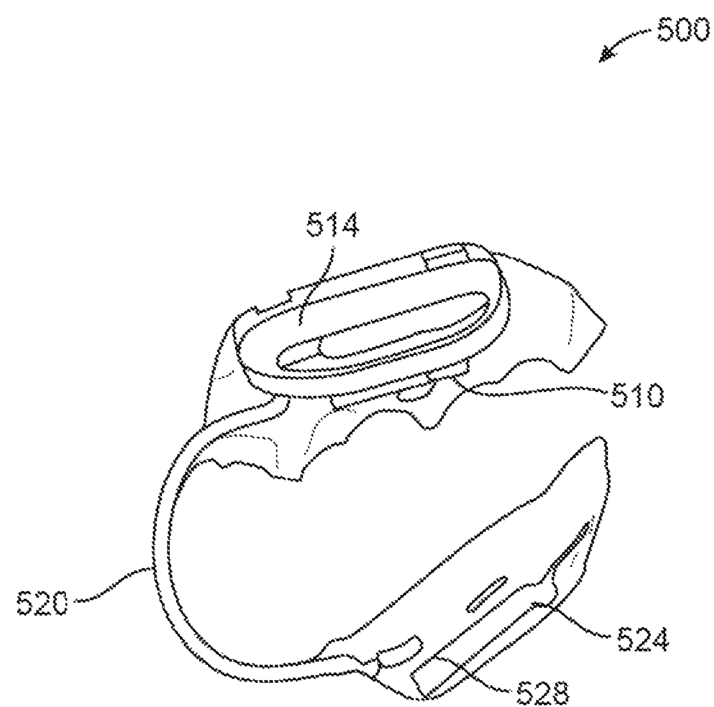
FIG. 1D shows an exemplary clam-shell configuration for an intraoral appliance for conducting sound transmission via bone conduction.

Another exemplary removable intraoral sound transmission appliance 500 is shown in FIG. 1D. The appliance includes a first chamber with a piezoelectric transducer 510 which is attached to a housing through a clip. A mass 514 is mechanically connected to the transducer 510. The transducer is controlled and powered by a wire that connects the first chamber to a second chamber that contains an antenna 520. A battery 524 provides power to both chambers, and to electronics 528 in the same chamber as well as in the first chamber. The appliance is in a clamshell configuration and is placed on only one side of the user's mouth such that the appliance contacts at least two surfaces of a tooth or teeth, preferably one or two of the back molars of one side of the user's mouth. The appliance can be placed on the one or two back molars of the upper jaw or lower jaw of the user with the appliance oriented such that the wire 520 connecting each chamber of the appliance wraps around the back surface of the hack molar of the user and provides the clamping force for the appliance on the back molar or molars of the user.

Figure 2:
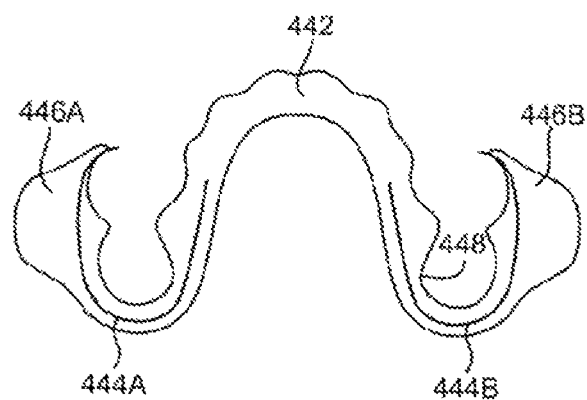
FIG. 2 shows a top view of another embodiment of an intraoral appliance for conducting sound transmission.

FIG. 2 shows a top view of another embodiment of an intraoral appliance. The appliance has a body portion 442 that supports two chambers 446A-446B that house the actuator, transceiver, control electronic, and power supply, among others. Two substantially C-shaped support wires 444A and 444B enable the appliance to clip onto the wearer's dental arch around curved regions 448 and to be secured therein. The C-shaped wire 444A or 444B provides a spring force to the actuator to keep it secured to the teeth. The wire material can be stainless steel or Nitinol, among others.

The inventor has discovered that the intraoral sound transmission appliance of the present invention when designed with certain specific parameters confers certain advantages with respect to the appliance and to the user as discussed above and immediately below. Specifically, the housing of the intraoral sound transmission appliance of the present invention is comprised of a form factor that is optimized for extended intra-oral wear to improve user comfort, safety, speech or appearance without impediment when wearing the appliance. More specifically, in the preferred embodiment, the appliance is designed and manufactured so that it conforms to one or more of the conditions specified in the table below:

TABLE

| Dimension | Specification | Effect | Observations |
|---|---|---|---|
| Buccal Side | | | |
| Width/Thickness (Buccal to Cheek) | 6 mm or less | Comfort, eating, bulging of the cheek | Anything over 6 mm will be uncomfortable since the width is larger than the natural cavity between the buccal surface of the teeth and the cheek. Also over an extended period of wear, the rubbing |

TABLE-continued

| Dimension | Specification | Effect | Observations |
|---|---|---|---|
| | | | of the appliance surface will irritate the tissue thereby causing soreness and tissue damage. Furthermore, this dimension in most subjects will cause bulging of the cheek which is cosmetically undesirable. Lastly, it will obstruct the natural flow of saliva and food in the oral cavity. |
| Length (Distal-messial) | 20 mm or less | Eating and aesthetics | Lengths of this dimension over 20 mm is aesthetically undesirable since the appliance will. be visible in most subjects when the subject smiles. |
| Height (occlusal-gingival) | 15 mm or less | Comfort, safety, eating | Anything over 15 mm will be uncomfortable since the height of the appliance if manufactured with a dimension greater than 15 mm will be bigger than the anatomical height of the vestibule. It is highly desirable to limit the height of the appliance and position it mostly on the tooth structure as opposed to the tissue to prevent tissue damage. In addition, the compliance mismatch between the hard surfaces of the appliance to the tissue may cause discomfort so by limiting the height of the appliance to 15 mm or less the risk of tissue damage and discomfort can be significantly reduced. |
| Form | Surface blending curvature 0.5 mm or larger | Comfort, safety | A surface curvature less than 0.5 mm will cause tissue damage and soreness in most subjects during extended wear of the appliance due to the unnaturally shaped profile. |
| Surface | Roughness index below 32 microns | Comfort, safety | Any roughness index greater than 32 microns will cause tissue damage and soreness in most subjects during extended wear of the appliance because the surface roughness will generate too much friction against soft tissues of the subject's mouth. |
| Material | Hydrophobic biocompatible polymer or metal | Comfort, safety | Hydrophilic materials will absorb moisture which in turn makes the device susceptible to bacterial growth. Also it will cause mouth dryness and discomfort. Therefore it is desirable to use biocompatible materials that have hydrophobic characteristics such as acrylics, urethane, polyester, polycarbonate in addition to metals such as stainless steel, titanium, nitinol and molybdenum alloys. |
| Lingual Side | | | |
| Width | 5 mm or less | Comfort, gag reflex, speech | If the width of the lingual side of the appliance is greater than 5 mm, the appliance will stimulate the gag reflex and also will cause speech impediment in the user. Furthermore, a width greater than 5 mm will cause discomfort to the user. |
| Length | 30 mm or less | Comfort, gag reflex, speech | An appliance with a length greater than 30 mm will increase the probability of stimulating the gag reflex in most users and further will disrupt the user's natural speech and intelligibility of speech. |
| Height | 25 mm or less | Comfort, gag reflex, speech | An appliance with a height greater than 25 mm will increase the probability of stimulating the gag reflex in most users and further will disrupt the user's natural speech and intelligibility of speech. |
| Form | Winged design on gingival surface with minimum of 5 degrees angle to minimize the gap between the appliance and the palatal curvature | Comfort, Gag reflex, speech | In order to minimize the probability of stimulating the gag reflex, the disruption of the user's natural speech pattern and intelligibility of the speech, and overall comfort of the appliance for extended wear, the two ends of the appliance were designed to minimize the gap between the surface of the appliance and palatal curvature. Moreover, the thickness of the appliance at the two ends needs to be smaller than the thickness at the center of the appliance, which results in a wing shape design optimizing the transition from palate to the surface of the appliance. |
| Surface | Roughness index below 32 microns | Comfort, safety | A larger roughness index will cause tissue damage and soreness in most users during extended wear of the device. |
| Material | Hydrophobic biocompatible polymer or metal | Comfort, safety | Hydrophilic materials will absorb moisture which in turn makes the appliance susceptible to bacterial growth. Also it will cause mouth dryness and discomfort. Therefore it is desirable to use biocompatible materials that have |

TABLE-continued

| Dimension | Specification | Effect | Observations |
|---|---|---|---|
| | | | hydrophobic characteristics such as acrylics, urethane, polyester, polycarbonate in addition to metals such as stainless steel, titanium, nitinol and molybdenum alloys. |
| Occlusal Surface | | | |
| | No occlusal coverage | Comfort, eating, risk of TMJ | Placing any foreign material in the bite path will cause discomfort for extended wear. Also, this could potentially cause TMJ and pain associated with TMJ if the appliance is used while eating. |
| Interproximal Buccal/Lingual prominence | Material filling in the interproximal contour of the lingual and/or buccal surface of the teeth | Provide anchorage to stabilize the appliance for functionality, improve comfort while chewing | To stabilize the appliance from distal-messial and occlusal-gingival movement, the inventor has discovered that adding material filling in the interproximal contour of the lingual and or buccal surface of the teeth provides increased anchorage to improve comfort while chewing. |
| Distal Spring | | | |
| Shape | The distal spring is comprised of a wire that is adapted to the distal of the last molar to avoid occlusal interference and connect the buccal and lingual components (chambers) | Comfort, gag reflex | The wire must be designed to be as close as possible to the distal molar while not interfering with the bite of the user, otherwise the appliance can stimulate the gag reflex or damage the tooth during natural mastication. |
| Material | NiTi, SS, Plastic (name) composite material | Biocomp and material strength needed to generate the force based on diameter | The distal spring connects the two components (chambers) of the appliance and at the same provides spring force to ensure adequate contact between the surfaces of the appliance for anchorage and sound delivery. The spring materials suitable for this application are Nitinol, Stainless Steel, Titanium and high strength polymers and/or composite material. |
| Diameter | Less than 0.060" | Comfort | Wire diameter larger than 0.060" may stimulate the gag reflex and induce discomfort in most users. |
| Force | 0.5 to 3 Newton force | Securing the appliance to ensure proper contact for adequate sound transmission | A minimum of 0.5 Newton of force is required to provide adequate spring force for securing the appliance to the tooth or teeth and transmitting sound. A force greater than 3 Newtons will not provide any additional benefit but instead will cause discomfort to the user because of the increased squeezing force of the spring on the tooth. |
| Width | Less than 3 mm | Comfort and speech | If the width of the appliance in the W shape design is greater than 3 mm, it will cause discomfort and speech impediment resulting from displacement of the tip of the tongue. |
| Location | A strap between gingival margin to 15 mm palatal to the gingival margin of the upper incisors to connect both sides of the appliance | Comfort and speech | The location of the bridge or strap can significantly impact comfort and speech and placing it between the gingival margin and up to 15 mm palatal to the gingival margin provides the optimal balance between comfort and minimization of the disruption of normal speech caused by the placement of the strap in the pathway of the tongue. |
| Contour | A Shape custom-formed to the wearer's dental and palatal anatomy | Comfort | Unless the thickness of the device is less than .060 inches, the shape of the strap/bridge should be fabricated to be custom formed to the wearer's dental and palatal anatomy to provide the optimal comfort necessary for extended wear. |

TABLE-continued

| Dimension | Specification | Effect | Observations |
|---|---|---|---|
| any one dimension | 16 mm or greater | Risk of swallowing the appliance | One of the safety concerns of an intraoral device such as an intraoral sound transmission appliance is the potential risk for the user to accidentally swallow the appliance thereby partially or completely blocking the esophagus or trachea. To minimize this risk, the x, y, or z dimension of the appliance must be at minimum 16 mm or greater, which is greater than the diameter of a "clinically normal" esophagus or trachea. At this size, the appliance cannot be swallowed intentionally since the natural gag reflex will prevent this from happening. In case of accidental swallowing (unintentional), this size prevents the appliance from entering the esophagus or trachea. |
| Metal Contacts for charging & programming | | | |
| Buccal | any surface other than the tooth facing surface | Safety, potential to scratch the teeth | Prevents damaging the dental anatomy by having the metal contact the tooth structure. |
| Lingual | any surface other than the tooth facing surface | Safety, potential to scratch the teeth | Prevents damaging the dental anatomy by having the metal contact the tooth structure. |
| Material | Gold, Platinum or plated | Corrosion resistance | Safety, biocompatibility with good conduction |
| Form | counter bore or spherical shape | Comfort | To ensure that presence of the metal contact is not felt by the tongue and therefore causing soreness and discomfort for extended wear. |

Figure 3:
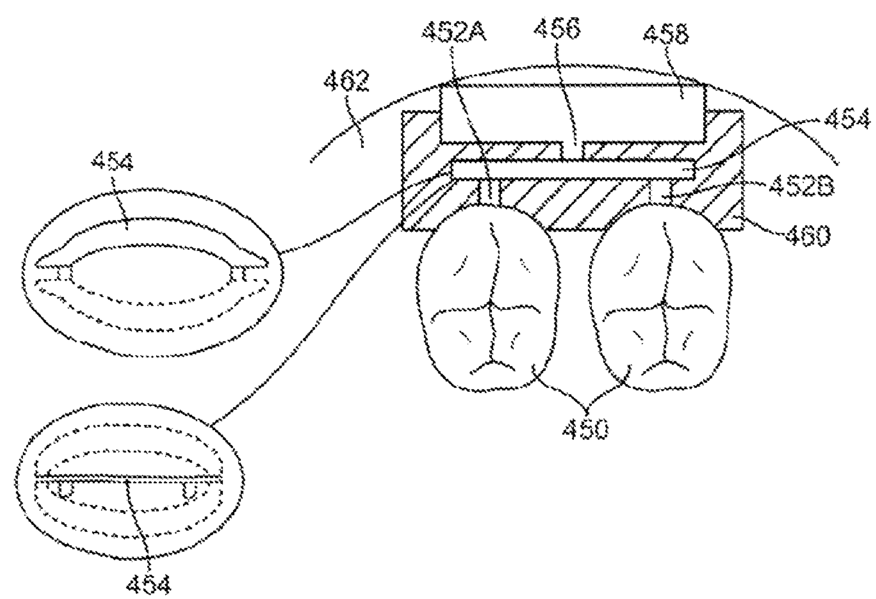
FIG. 3 shows a diagram illustrating the coupling of the actuator to one or more teeth.

FIG. 3 shows an exemplary cross-sectional view showing the coupling of the sound transducer to one or more teeth 450. In FIG. 3, a mounting unit 452 such as a retainer-like housing is placed over one or more teeth 450. The mounting unit 452 can also be adhesive or glue or a suitable system to secure the appliance to the teeth 450. An actuator 454 rests above support arms or links 452A and 452B which are mechanically connected to the teeth 450.

In one embodiment, the actuator 454 is a piezoelectric transducer made with PZT. PZT-based compounds (Pb [ZrxTi1−x]O3 0<x<1, also lead zirconium titanate) are ceramic perovskite materials that develop a voltage difference across two of its facets when highly compressed. Being piezoelectric, it develops a voltage difference across two of its faces when compressed (useful for sensor applications), or physically changes shape when an external electric field is applied (useful for actuators and the like). The material is also ferroelectric, which means it has a spontaneous electric polarization (electric dipole) which can be reversed in the presence of an electric field. The material features an extremely large dielectric constant at the morphotropic phase boundary (MN)) near x=0.52. These properties make PZT-based compounds one of the most prominent and useful electroceramics.

The actuator 454 is also connected to a mass 458 through a mass arm 456. In one embodiment, the actuator 454 uses PZT in a rectangular beam bender configuration. The mass 458 can be a tungsten material or any suitable weight such as the battery or control electronics, among others. The support arms or links 452A-4528 as well as the mass arm 456 are preferably made from ceramic or alumina which enables acoustic or sound energy to be efficiently transmitted by the mounting unit 454.

The appliance can be a custom oral device. The sound source unit can contain a short-range transceiver that is protocol compatible with the linking unit. For example, the sound source can have a Bluetooth transceiver that communicates with the Bluetooth transceiver linking unit in the appliance. The appliance can then receive the data transmitted over the Bluetooth protocol and drive a bone conduction transducer to render or transmit sound to the user.

The appliance can have a microphone embedded therein. The microphone can be an immoral microphone or an extraoral microphone. For cellular telephones and other telephones, as second microphone can be used to cancel environmental noise and transmit a user's voice to the telephone. A noise canceller receives signals from the microphones and cancels ambient noise to provide a clean sound capture.

The appliance can have another microphone to pick up ambient sound. The microphone can be an intraoral microphone or an extraoral microphone. In one embodiment, the microphone cancels environmental noise and transmits a user's voice to the remote station. This embodiment provides the ability to cancel environmental noises while transmitting subject's own voice to the actuator 432. As the microphone is in a fixed location (compared to ordinary wireless communication devices) and very close to user's own voice, the system can handle environmental noise reduction that is important in working in high noise areas.

The system couples microphones and voicing activity sensors to a signal processor. The processor executes a detection algorithm, and a denoising code to minimize background acoustic noise. Two microphones can be used, with one microphone being the bone conduction microphone and one which is considered the "signal" microphone. The second microphone captures air noise or ambient noise, whose signal is filtered and subtracted from the signal in the first microphone. In one embodiment, the system runs an array algorithm for speech detection that uses the difference in frequency content between two microphones to calculate a relationship between the signals of the two microphones. As known in the art and discussed in U.S. Pat. No. 7,246,058, the content of which is incorporated by reference, this embodiment can cancel noise without requiring a specific orientation of the array with respect to the signal.

In another embodiment, the appliance can be attached, adhered, or otherwise embedded into or upon a removable oral appliance or other oral device to term a medical tag containing patient identifiable information. Such an oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

In yet another embodiment, microphones can be place on each side of the ears to provide noise cancellation, optimal sound localization and directionality. The microphones can be placed inside or outside the ears. For example, the microphones can be placed either at the opening or directly with the user's ear canals. Each of the systems includes a battery, a signal processor, a transmitter, all of which can be positioned in a housing that clips onto the ear which, rests behind the ear between the pinna and the skull, or alternatively can be positioned in the ear's concha. The transmitter is connected to a wire/antenna that in turn is connected to the microphone. Each transmitter transmits information to a receiver that activates a transducer that is powered by a battery. Each side of the head can have one set of receiver, transducer and battery. This embodiment provides a bone conduction hearing aid device with dual externally located microphones that are placed at the entrance to or in the ear canals and an oral appliance containing dual transducers in communication with each other. The device will allow the user to enjoy the most natural sound input due to the location of the microphone which takes advantage of the pinna for optimal sound localization (and directionality).

In another embodiment, the microphones receive sound signals from both sides of the head, processes those signals to send a signal to the transducer on the side of the head where the sound is perceived by the microphone to be at a higher sound level. A phase-shifted signal is sent to the transducer on the opposite side of the head. These sounds will then "add" in the cochlea where the sound is louder and "cancel" on the opposite cochlea providing the user with the perception of directionality of the sound.

In yet another embodiment, the microphone at the first ear receives sound signals from the first side of the head, processes those signal to send a signal to the transducer on that same or first side of the oral appliance. A second microphone at the second ear receives a sound signal that is lower in amplitude and delayed in respect to the sound sensed by the first microphone due to head shadowing and physical separation of the microphones, and sends a corresponding signal to the second transducer on the second side of the oral appliance. The sound signals from the transducers will be perceived by each cochlea on each side of the head as being different in amplitude and phase, which will result in the perception of directionality by the user.

In one embodiment where the microphone is mounted in the user's ear canal, components such as the battery, the signal processor, and the transmitter can either be located behind the ear or within the folds of the pinna. The human auricle is an almost rudimentary, usually immobile shell that lies close to the side of the head with a thin plate of yellow fibrocartilage covered by closely adherent skin. The cartilage is molded into clearly defined hollows, ridges, and furrows that form an irregular, shallow funnel. The deepest depression, which leads directly to the external auditory canal, or acoustic meatus, is called the concha. It is partly covered by two small projections, the tonguelike tragus in front and the antitragus behind. Above the tragus a prominent ridge, the helix, arises from the floor of the concha and continues as the incurved rim of the upper portion of the auricle. An inner, concentric ridge, the antihelix, surrounds the concha and is separated from the helix by a furrow, the scapha, also called the fossil of the helix. The lobule, the fleshy lower part of the auricle, is the only area of the outer ear that contains no cartilage. The auricle also has several small rudimentary muscles, which fasten it to the skull and scalp. In most individuals these muscles do not function, although some persons can voluntarily activate them to produce limited movements. The external auditory canal is a slightly curved tube that extends inward from the floor of the concha and ends blindly at the tympanic membrane. In its outer third the wall of the canal consists of cartilage; in its inner two-thirds, of bone. The anthelix (antihelix) is a folded "Y" shaped part of the ear. The antitragus is the lower cartilaginous edge of the conchal bowl just above the fleshy lobule of the ear. The microphone is connected with the transmitter through the wire and antenna. The placement of the microphone inside the ear canal provides the user with the most natural sound input due to the location of the microphone which takes advantage of the pinna for optimal sound localization (and directionality) when the sounds are transmitted to the cochlea using a straight signal and "phase-shifted." signal to apply directionality to the patient. High quality sound input is captured by placing the microphones within or at the entrance of the ear canal which would allow the patient to use the sound reflectivity of the pinna as well as improved sound directionality due to the microphone placement. The arrangement avoids the need to separate the microphone and speaker to reduce the chance of feedback and allows placement of the microphone to take advantage of the sound reflectivity of the pinna. The system also allows for better sound directionality due to the two bone conduction transducers being in electrical contact with each other. With the processing of the signals prior to being sent to the transducers and the transducers able to communicate with each other, the system provides the best sound localization possible.

The appliance can include a data storage device such as a solid state memory or a flash storage device. The content of the data storage device can be encrypted for security. The linking unit can transmit encrypted data for secure transmission if desired.

The appliance may be fabricated from various polymeric or a combination of polymeric and metallic materials using any number of methods, such as computer-aided machining processes using computer numerical control (CNC) systems or three-dimensional printing processes, e.g., stereolithography apparatus (SLA), selective laser sintering (SLS), and/or other similar processes utilizing three-dimensional geometry of the patient's dentition, which may be obtained via any number of techniques. Such techniques may include use of scanned dentition using intra-oral scanners such as laser, white light, ultrasound, mechanical three-dimensional touch scanners, magnetic resonance imaging (MRI), computed tomography (CT), other optical methods, etc.

In forming the removable oral appliance, the appliance may be optionally formed such that it is molded to fit over the dentition and at least a portion of the adjacent gingival tissue to inhibit the entry of food, fluids, and other debris into the oral appliance and between the transducer assembly and tooth surface. Moreover, the greater surface area of the oral appliance may facilitate the placement and configuration of the assembly into the appliance.

Additionally, the removable oral appliance may be optionally fabricated to have a shrinkage factor such that when placed onto the dentition, oral appliance may be configured to securely grab onto the tooth or teeth as the appliance may have a resulting size slightly smaller than the scanned tooth or teeth upon which the appliance was formed. The fitting may result in a secure interference fit between the appliance and underlying dentition.

In one variation, an extra-buccal transmitter assembly located outside the patient's mouth may be utilized to receive auditory signals for processing and transmission via a wireless signal to the electronics and/or transducer assembly positioned within the patient's mouth, which may then process and transmit the processed auditory signals via vibratory conductance to the underlying tooth and consequently to the patient's inner ear. The transmitter assembly, as described in further detail below, may contain a microphone assembly as well as a transmitter assembly and may be configured in any number of shapes and forms worn by the user, such as a watch, necklace, lapel, phone, belt-mounted device, etc.

Figure 4A:
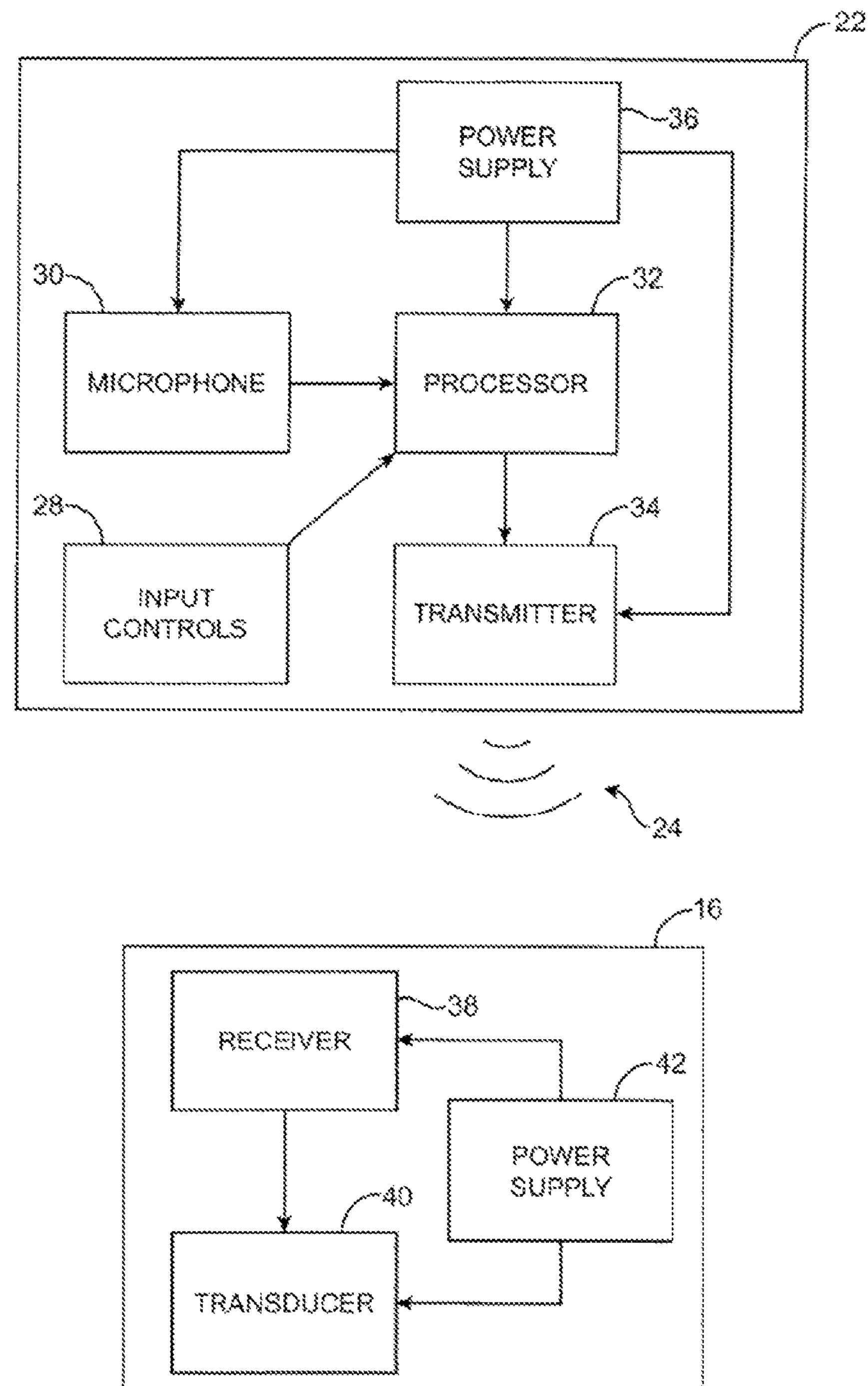
FIG. 4A shows an illustrative configuration of the individual components in a variation of the oral appliance device having an external transmitting assembly with a receiving and transducer assembly within the mouth.

FIG. 4A illustrates a schematic representation of one variation of two-way communication assembly 14 utilizing an extra-buccal transmitter assembly 22, which may generally comprise microphone 30 for receiving sounds and which is electrically connected to processor 32 for processing the auditory signals. Processor 32 may be connected electrically to transmitter 34 for transmitting the processed signals to the electronics and/or transducer assembly 16 disposed upon or adjacent to the user's teeth. The microphone 30 and processor 32 may be configured to detect and process auditory signals in any practicable range, but may be configured in one variation to detect auditory signals ranging from, e.g., 250 Hertz to 20,000 Hertz.

With respect to microphone 30, a variety of various microphone systems may be utilized. For instance, microphone 30 may be a digital, analog, and/or directional type microphone. Such various types of microphones may be interchangeably configured to be utilized with the assembly, if so desired.

Power supply 36 may be connected to each of the components in transmitter assembly 22 to provide power thereto. The transmitter signals 24 may be in any wireless form utilizing, e.g., radio frequency, ultrasound, microwave, Blue Tooth® (BLUETOOTH SIG, INC., Bellevue, Wash.), etc. for transmission to assembly 16. Assembly 22 may also optionally include one or more input controls 28 that a user may manipulate to adjust various acoustic parameters of the electronics and/or transducer assembly 16, such as acoustic focusing, volume control, filtration, muting, frequency optimization, sound adjustments, and tone adjustments, etc.

The signals transmitted 24 by transmitter 34 may be received by electronics and/or transducer assembly 16 via, receiver 38, which may be connected to an internal processor for additional processing of the received signals. The received signals may be communicated to transducer 40, which may vibrate correspondingly against a surface of the tooth to conduct the vibratory signals through the tooth and bone and subsequently to the middle ear to facilitate hearing of the user. Transducer 40 may be configured as any number of different vibratory mechanisms. For instance, in one variation, transducer 40 may be an electromagnetically actuated transducer. In other variations, transducer 40 may be in the form of a piezoelectric crystal having a range of vibratory frequencies, e.g., between 250 to 4000 Hz.

Power supply 42 may also be included with assembly 16 to provide power to the receiver, transducer, and/or processor, if also included. Although power supply 42 may be a simple battery, replaceable or permanent, other variations may include a power supply 42 which is charged by inductance via an external charger. Additionally, power supply 42 may alternatively be charged via direct coupling to an alternating, current (AC) or direct current (DC) source. Other variations may include a power supply 42 which is charged via a mechanical mechanism, such as an internal pendulum or slidable electrical inductance charger as known in the art, which is actuated via, e.g., motions of the jaw and/or movement for translating the mechanical motion into stored electrical energy for charging power supply 42.

Figure 4B:
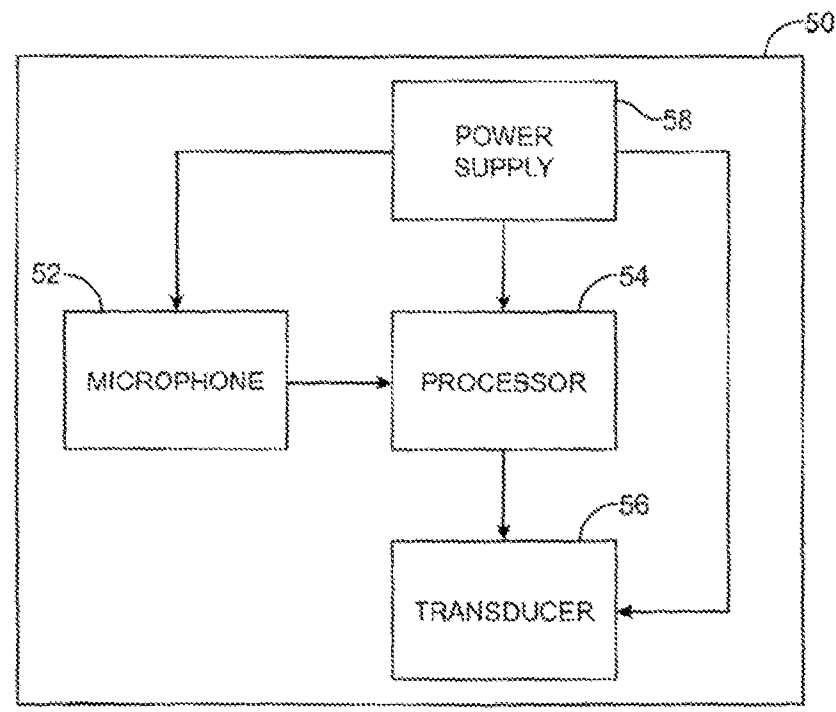
FIG. 4B shows an illustrative configuration of another variation of the device in which the entire assembly is contained by the oral appliance within the user's mouth.

In another variation of assembly 16, rather than utilizing an extra-buccal transmitter, two-way communication assembly 50 may be configured as an independent assembly contained entirely within the user's mouth, as shown in FIG. 4B. Accordingly, assembly 50 may include an internal microphone 52 in communication with an on-board processor 54. Internal microphone 52 may comprise any number of different types of microphones, as described above. Processor 54 may be used to process any received auditory signals for filtering, and/or amplifying the signals and transmitting, them to transducer 56, which is in vibratory contact against the tooth surface. Power supply 58, as described above, may also be included within assembly 50 for providing power to each of the components of assembly 50 as necessary.

In yet other variations, vibrations may be transmitted directly into the underlying boric or tissue structures rather than transmitting directly through the tooth or teeth of the user.

For any of the variations described above, they may be utilized as a single device or in combination with any other variation herein, as practicable, to achieve the desired hearing level in the user. Moreover, more than one oral appliance device and electronics and/or transducer assemblies may be utilized at any one time.

Moreover, each of the different transducers can also be programmed to vibrate in a manner which indicates the directionality of sound received by the microphone worn by the user. For example, different transducers positioned at different locations within the user's mouth can vibrate in a specified manner by providing sound or vibrational queues to inform the user which direction a sound was detected relative to an orientation of the user. For instance, a first transducer located, e.g., on a user's left tooth, can be programmed to vibrate for sound detected originating from the user's left side. Similarly, a second transducer located, e.g., on a user's right tooth, can be programmed to vibrate for sound detected originating from the user's right side. Other variations and queues may be utilized as these examples are intended to be illustrative of potential variations.

In variations where the one or more microphones are positioned in intra-buccal locations, the microphone may be integrated directly into the electronics and/or transducer assembly, as described above. However, in additional variation, the microphone unit may be positioned at a distance from the transducer assemblies to minimize feedback.

Modification of the above-described embodiments of the intraoral appliance and methods for carrying out the invention, combinations between different variations as practicable, and variations of aspects of the invention that are obvious to those of skill in the art are intended to be within the scope of the claims.

What is claimed is:

1. An intraoral appliance for sound transmission, comprising:

an intra-oral bone conduction sound transmission device capable of being affixed in the mouth of a user by producing an interference fit between the device and at least two surfaces of one or more teeth; and a housing for containing the intra-oral bone conduction sound transmission device, the housing having a form factor optimized for extended intra-oral wear of at least two hours and until removal by the user to improve user comfort, the housing including first and second portions connected by a bridge and secured to the one or more teeth.

2. The appliance of claim 1, comprising:

an actuator to provide bone conduction sound transmission; and an amplifier or actuator driver coupled to the actuator to cause the actuator to generate sound.

3. The appliance of claim 2, comprising a wireless receiver coupled to the actuator driver or amplifier.

4. The appliance of claim 2, comprising a sound player coupled to the amplifier or actuator driver.

5. The appliance of claim 2, comprising a mass coupled to the actuator.

6. The appliance of claim 5, wherein the mass comprises one of a weight, a battery, an electronics module.

7. The appliance of claim 2, wherein the actuator comprises a piezoelectric transducer.

8. The appliance of claim 1, wherein one of the portions house a power source to drive the actuator and the amplifier or actuator driver.

9. The appliance of claim 1, wherein the bridge comprises electrical cabling or an antenna embedded in the bridge.

10. The appliance of claim 1, wherein the bridge comprises one of: a wired frame, a polymeric material, a combination of polymeric material and a wired frame.

11. The appliance of claim 1, wherein the portions comprises a buccal to cheek width or thickness of about 6 mm or less.

12. The appliance of claim 1, wherein the portions comprises a distal to messial length of approximately 20 mm or less.

13. The appliance of claim 1, wherein the portions comprises an occlusal to gingival height of approximately 15 mm or less.

14. The appliance of claim 1, wherein the portions comprises a surface with a curvature of approximately 0.5 mm or more.

15. The appliance of claim 1, wherein the portions comprises a surface roughness index of less than approximately 32 microns.

16. The appliance of claim 1, wherein the portions comprises a hydrophobic biocompatible polymer, metal or material.

17. The appliance of claim 1, wherein the portions comprises a lingual width of about 5 min or less.

18. The appliance of claim 1, wherein the portions comprises a lingual length of approximately 30 mm or less.

19. The appliance of claim 1, wherein the portions comprises a lingual height of approximately 25 mm or less.

20. The appliance of claim 1, wherein the portions comprises a winged shape on a gingival surface with at least a five degree angle to minimize a gap between the portions and a palatal curvature.

21. The appliance of claim 1, wherein the portions comprises a lingual surface roughness of approximately 32 microns or less.

22. The appliance of claim 1, wherein the portions comprises an absence of occlusal coverage.

23. The appliance of claim 1, comprising, a distal spring to clamp the portions to the one or more teeth.

24. The appliance of claim 23, wherein the distal spring comprises a wire to connect buccal and lingual components.

25. The appliance of claim 23, wherein the distal spring comprises NiTi, stainless steel, plastic, or a composite material.

26. The appliance of claim 23, wherein the distal spring comprises a diameter of approximately less than 0.06 inch.

27. The appliance of claim 1, wherein the distal spring provides a force between approximately 0.5 Newton to 3 Newtons.

28. The appliance of claim 1, wherein the portions comprises a W-shaped bridge.

29. The appliance of claim 1, wherein the bridge comprises a width of approximately 3 mm or less.

30. The appliance of claim 1, wherein the bridge comprises a strap one or more upper incisors to connect both sides of the appliance.

31. The appliance of claim 29, wherein the strap is between a gingival margin to approximately 15 mm palatal to the gingival of an upper incisor.

32. The appliance of claim 1, wherein the bridge comprises a custom shape formed to a patient's dental or palatal anatomy.

33. The appliance of claim wherein the portions comprises dimensions each approximately 16 mm or greater.

34. The appliance of claim 1, comprising one or more contacts for charging or programming.

35. The appliance of claim 33, wherein the contact is positioned in any surface other than a tooth facing surface.

36. The appliance of claim 33, wherein the contact is positioned buccally or lingually in any surface other than a tooth facing surface.

37. The appliance of claim 33, wherein the contact comprises gold, platinum gold plated or platinum plated material.

38. The appliance of claim 33, wherein the contact comprises a counter bore or a spherical shape.

* * * * *